(12) United States Patent
Hoffman et al.

(10) Patent No.: US 9,078,540 B2
(45) Date of Patent: Jul. 14, 2015

(54) PROCESS AND DEVICE FOR FORMING A LOW ADHESION COOKING SURFACE

(75) Inventors: Steve Hoffman, Mahwah, NJ (US); Robert E. Cannuscio, West Chester, PA (US)

(73) Assignee: Steve Hoffman, Mahwah, NJ (US)

( * ) Notice: Subject to any disclaimer, the term of this patent is extended or adjusted under 35 U.S.C. 154(b) by 357 days.

(21) Appl. No.: 12/862,400

(22) Filed: Aug. 24, 2010

(65) Prior Publication Data

US 2012/0052172 A1 Mar. 1, 2012

(51) Int. Cl.
| | |
|---|---|
| B05B 5/00 | (2006.01) |
| A47J 36/00 | (2006.01) |
| B29C 59/10 | (2006.01) |
| A47J 37/10 | (2006.01) |
| B05B 5/025 | (2006.01) |
| H05F 3/04 | (2006.01) |
| B05B 5/16 | (2006.01) |

(52) U.S. Cl.
CPC ............... *A47J 37/108* (2013.01); *A47J 36/00* (2013.01); *B05B 5/025* (2013.01); *B05B 5/1691* (2013.01); *B29C 59/10* (2013.01); *H05F 3/04* (2013.01); *Y10T 29/51* (2015.01)

(58) Field of Classification Search
USPC ............................................... 118/620, 723 E
See application file for complete search history.

(56) References Cited

U.S. PATENT DOCUMENTS

| | | | |
|---|---|---|---|
| 2,939,606 A | 6/1960 | Durbin | |
| 3,735,749 A | 5/1973 | Binks et al. | |
| 3,794,016 A | 2/1974 | Binks et al. | |
| 4,291,617 A | 9/1981 | Miller et al. | |
| 4,452,132 A | 6/1984 | Miller et al. | |
| 4,619,053 A | 10/1986 | Schumacher | |
| 6,630,648 B2 | 10/2003 | Gruenwald | |
| 6,632,407 B1 * | 10/2003 | Lau et al. | 422/186 |
| 6,782,625 B1 * | 8/2004 | Wong | 30/43.92 |
| 7,193,124 B2 * | 3/2007 | Coffee | 602/48 |
| 7,222,563 B2 | 5/2007 | Reckert et al. | |
| 2001/0030025 A1 * | 10/2001 | Fujita | 118/723 E |
| 2003/0024922 A1 | 2/2003 | Stanger et al. | |
| 2008/0210693 A1 | 9/2008 | Hoffman et al. | |
| 2009/0009090 A1 * | 1/2009 | Viol et al. | 315/111.21 |
| 2009/0103231 A1 * | 4/2009 | Young | 361/232 |

FOREIGN PATENT DOCUMENTS

| | | |
|---|---|---|
| GB | 211544 | 11/1922 |
| WO | WO 2007/026202 | 3/2007 |

OTHER PUBLICATIONS

European Search Report dated Nov. 23, 2011.
Examination Report.

* cited by examiner

*Primary Examiner* — Dah-Wei D Yuan
*Assistant Examiner* — Binu Thomas
(74) *Attorney, Agent, or Firm* — Drinker Biddle & Reath LLP (57) ABSTRACT

A process and device are disclosed for creating a low adhesion cooking surface. The process involves placing a hydrogen containing substance on a cooking surface; and extracting the hydrogen from the substance so that the hydrogen remains in recesses on the cooking surface. The hydrogen may be extracted by creating an electric charge on the surface, the electric charge drawing hydrogen into pores or recesses in the surface. The device preferably includes a housing which contains a high voltage generator. The output end of the generator is positioned so as to generate an electric arc when activated.

17 Claims, 8 Drawing Sheets

PROCESS AND DEVICE FOR FORMING A LOW ADHESION COOKING SURFACE

FIELD OF THE INVENTION

The present invention relates to a cooking surface and, more particularly, to a process and device for forming a low adhesion cooking surface.

BACKGROUND

One of the primary annoyances with cooking is the cleaning of the cooking articles. As food cooks it has a tendency to adhere to the cooking surface. The reason for this is that the surface itself is not smooth on a microscopic level. Hence, the heating of the food causes food particles to bake onto the rough areas on the cooking surface.

To prevent food from adhering, a layer of liquid is generally added during the cooking process. This liquid is usually an oil, lard, or butter which has low friction and not prone to sticking to the cooking surface.

However, cooking fats, oils, and butter begin to scorch and smoke at about 392° F. (200° C.), and also begin to evaporate during the cooking process or absorb into the food. Since meat is usually cooked at temperatures between 400-450° F. (200-230° C.), the result is that the fats or oils eventually evaporate leaving the food once again in direct contact with the cooking surface. As such, even when cooking fats and oils are used, the food eventually sticks to the cooking surface.

Another drawback of cooking oil and grease is that they do not prevent sticking unless they are heated. Oil naturally has impurities, such as water. The applicant has determined that, when heated, the water in the oil rises to the surface of the oil. This creates a barrier layer between the food and the oil. It is this barrier layer of water that prevents the sticking to the pan. Many cook books describe the heating of the oil until it shimmers. The shimmering is the barrier layer of water on top of the oil.

One of the biggest advances over the last several decades in food preparation has been the development of what has been called "non-stick" coatings. The most well known of these is polytetrafluoroethylene (PTFE) sold under the trademark Teflon® by the DuPont company. The vast majority of cooking surfaces are coated with Teflon or similar non-stick coatings. Teflon® material itself is chemically inert and non-toxic. Teflon® material has a coefficient of friction of about 0.1 or less which is the lowest of any known solid material. Thus, Teflon® material provides a very efficient non-stick surface.

However, at least one report states that Teflon begins to deteriorate after the temperature of cookware reaches about 460° F. (237° C.), and begins to significantly deteriorate when the temperature of the cookware reaches about 680° F. (350° C.). See, definition of Teflon found at Wikipedia.org. Since the material can degrade at higher temperatures, there are heat constraints which might negatively affect cooking requirements.

Also, some recent reports have identified some health concerns with the use of PTFE material. See: http://en.wikipedia.org/wiki/Teflon. Further Teflon material tends to be a relatively fragile material, thus requiring protective handling to prevent scratching. As such, there is a need to find a replacement technology for providing a non-stick cooking surface.

SUMMARY OF THE INVENTION

A process for forming a low adhesion cooking surface is disclosed. In one embodiment, the process involves the steps of placing a treatment material or hydrogen containing substance on a surface, and extracting or causing hydrogen ions from the substance to remain on the cooking surface.

The hydrogen containing substance may be a hydrogenated oil applied to the surface and the step of extracting hydrogen involves creating an electric charge on the surface, the electric charge drawing or driving hydrogen into pores or recesses in the surface. The electric charge may be created through the use of a probe or applicator connected to a power source, where a portion of the surface may be grounded prior to creating the electric charge.

In another embodiment of the invention, an applicator is provided that include a mechanism for generating a high voltage arc to a cooking surface. The high voltage drives hydrogen ions out of the treatment material, such as a hydrogenated oil, that is applied to the cooking surface, and causes the charged ions to adhere to the cooking surface.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention that is presently preferred. However, it should be understood that this invention is not limited to the precise arrangements and instrumentalities shown in the drawings.

DESCRIPTION OF THE INVENTION

The present invention is directed to a process for creating a non-stick surface on a cooking surface and a device that produces that surface. The cooking surface may be made from any suitable material such as metal, that can withstand the high temperatures and surface contacts, such as scraping with a cooking utensil, that are anticipated in a conventional cooking operation.

Figure 1:
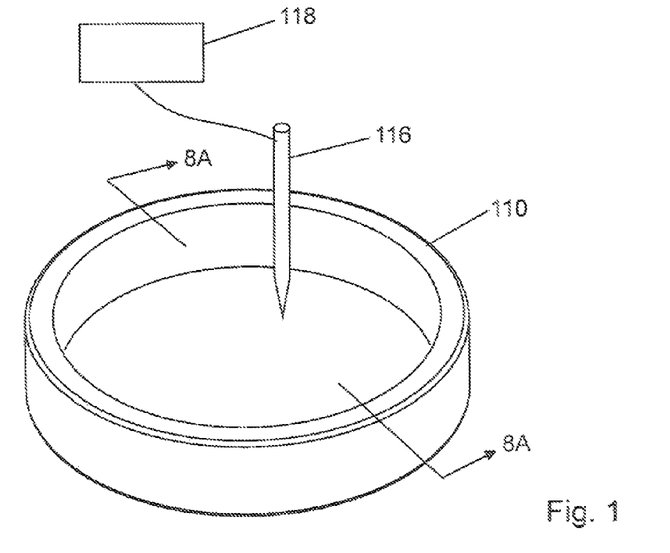
FIG. 1 is an isometric view of a cooking surface according to an aspect of the present invention.

As shown in FIG. 1, in one preferred embodiment, the cooking surface is in the form of a frying pan. However, the invention is not limited to that particular configuration, but can be applied to any suitable cooking device, such as baking sheets, pots, etc. Thus, the illustrated embodiment is simply intended to present one example of cooking surface according to the present invention.

As will be discussed below, the present invention includes the application of a treatment material which includes hydrogen. At standard temperature and pressure, hydrogen is colorless, odorless, nonmetallic and tasteless. One preferred treatment material is conventional hydrogenated oil, such as in vegetable oils.

It is also contemplated that the pan can have a mechanism for producing hydrogen or otherwise have the hydrogen stored inside the pan. See for example, US Patent Publication No. 2008/0210693, the disclosure of which is incorporated herein by reference in its entirety.

It is contemplated that the atmospheric humidity that naturally exists on the surface of the cooking device may be sufficient to produce the desired amount of hydrogen to provide the treatment material, thus eliminating the need to include a separate source of the material.

Furthermore, if may be desirable to supply other treatment materials to enhance the cooking depending on the food being cooked. For example, it may be preferable to use one particular treatment material for meats and a different treatment material for fish.

Referring to FIGS. 1, 1A, 1B and 2A-2D, a process for forming a low adhesive surface is disclosed. In this embodiment, a conventional cooking surface 110, such as a pan or pot can be used. As discussed above, all metals tend to have some degree of porosity on a microscopic layer, such as between grain layers and on the surface itself, which appears pitted when viewed under a microscope (see, FIG. 2A). Both are referred to herein as forms of porosity or pores in the material surface. The pores in the metal provide cavities within which hydrogen can be stored or loaded for later use in a cooking process, thus eliminating the need to permeate the hydrogen from within. This process is illustrated in FIG. 2A-2D.

As discussed above, hydrogen can be liberated from various treatment liquids and gases, such as water, hydrogenated oils and even the ambient air to the extent it contains some degree of humidity. Since extracting hydrogen from air is a very slow process, the preferred treatment materials for use in extracting hydrogen are hydrogenated oils or water.

Figure 1A:
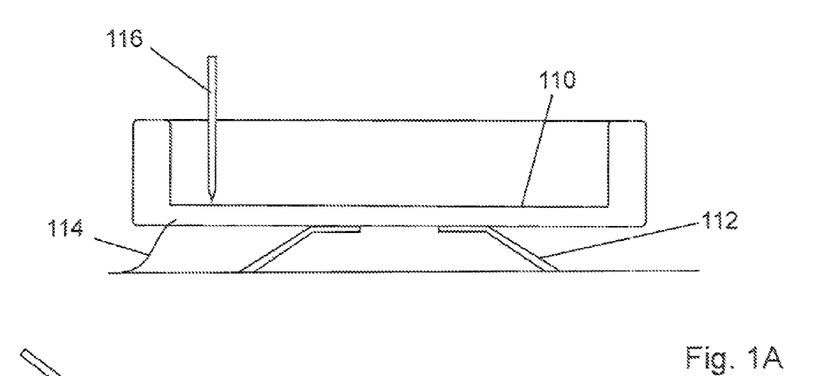
FIG. 1A cross-sectional side view of the cooking surface of FIG. 1 illustrative a process for forming a low adhesion cooking surface according to one embodiment of the invention.
Figure 1B:
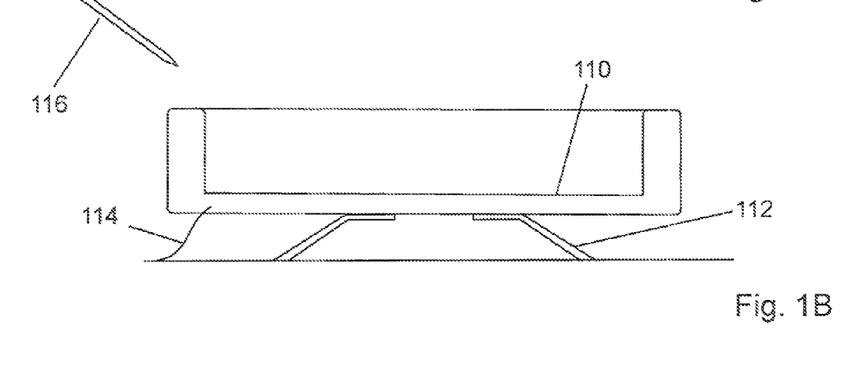
FIG. 1B cross-sectional side view of the cooking surface of FIG. 1 illustrating an alternate location for a probe for use in forming a low adhesion cooking surface according to the invention.

In order to extract the hydrogen from the water or oil molecules, it is necessary to charge the pot or pan. To do so, the present invention contemplates applying either a negative or positive charge to the pan. This can be done by preferably grounding the pan 110, such as through the conventional stove top grates 112 or a separate grounding wire 114 connected to the cooking surface and through the stove structure to a grounding point. A negative charge is then be applied to the top surface of the pan through use of a probe or electrode 116, for example, a corona discharge probe, that is connected to a power source 118 which supplies the voltage to produce the negative charge. In the present invention, only a small amount of voltage is necessary, well within safe levels for use in a residential environment. The power source could be a battery (DC source) or from a conventional home outlet (AC source) suitably stepped down to provide a safe voltage level. As shown in FIGS. 1A and 1B, the probe can be located in close proximity to the surface (FIG. 1A), or it can be located distance from the surface so that the charge is directed toward the surface.

Figure 2A:
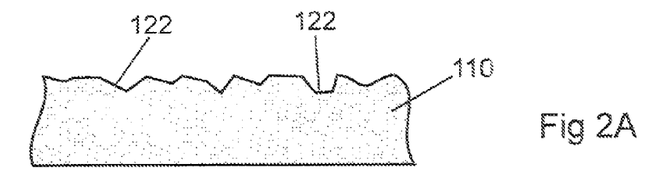
FIG. 2A is an enlarged schematic cross-sectional view of a portion of the cooking surface of FIG. 1A prior to application of a pretreatment material.
Figure 2B:
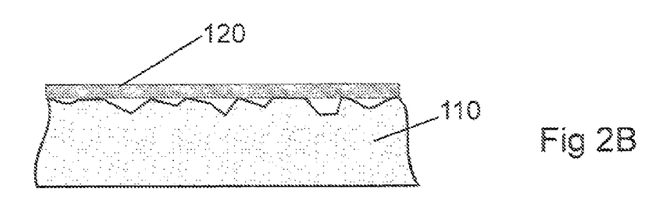
FIG. 2B is a schematic cross-sectional view of the portion of the cooking surface of FIG. 2A after the application of a pretreatment material.
Figure 2C:
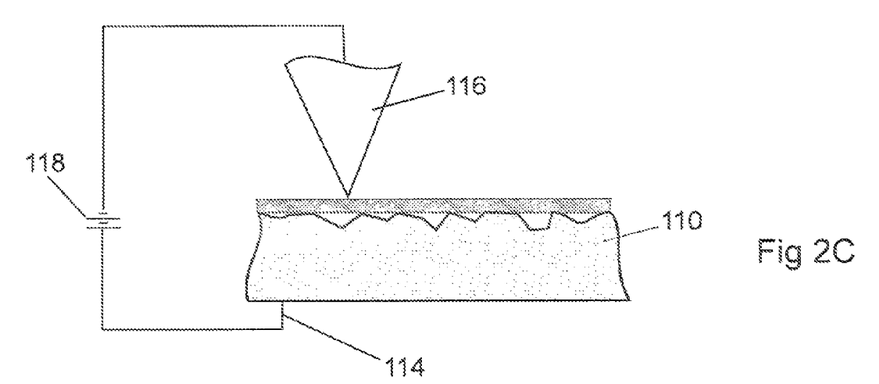
FIG. 2C is a schematic cross-sectional view of the portion of the cooking surface of FIG. 2A illustrating the application of a charge for loading the cooking surface with hydrogen according to one embodiment of the invention.
Figure 2D:
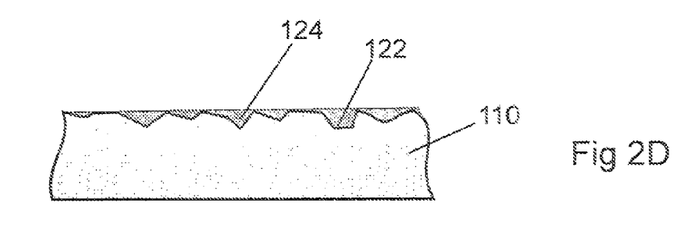
FIG. 2D is a schematic cross-sectional view of the portion of the cooking surface of FIG. 2A illustrating the cooking surface loaded with hydrogen according to one embodiment of the invention.

The probe or wand 116 will generate an arc when it is placed in close proximity to the grounded cooking surface 110. This causes the surface of the pan to become positively (or negatively) charged. If the surface of the pan is first treated with a treatment material 120, such as water, or more preferably hydrogenated oil, the charge will draw hydrogen molecules out of the oil and into the pores 122 in the pan. The application of the treatment material is depicted in FIG. 2B. A thin layer of treatment material is all that is needed to load the surface. Once the voltage is applied and the charge is created (FIG. 2C), the hydrogen molecules 124 will be drawn into the pores of cavities in the cooking surface (FIG. 2D). The longer that the charge is applied to the pan surface, the more hydrogen that will be pulled in from the oil and stored in the pores of the pan. However, at some point, depending on the size and number of the pores, the pan becomes fully treated (fully loaded) and cannot store significantly more hydrogen. Testing has shown that application of a charge for as little as a few seconds is sufficient to draw enough hydrogen into the pores of the pan for use in a cooking sequence. Of course, larger cooking surfaces will take longer to draw sufficient hydrogen into the pores than smaller surfaces.

Once the pan is hydrogenated or loaded, the natural charge in the material of the pan will keep the hydrogen attached to the pores. The cooking surface can then be stored for later use or can be used immediately. The longer the pan is stored the more likely that the hydrogen in the pores will begin to liberate to the atmosphere. So it is preferable that the pan is loaded shortly before use.

During use of the loaded cooking surface, the application of heat to the cooking surface will cause the hydrogen to become liberated out of the pores (outgassing) and form a layer on the surface of the cooking surface. This is due to the fact that the adhesion produced by the applied charge is less effective at elevated temperatures, i.e., heat reduces the adhesive force caused by the charge.

It is expected that certain cooking surfaces, such as glass or ceramic, will need a higher voltage to cause the surface to be positively charged. Thus, the voltage and corona discharge times can be tailored to the material of the cooking surface.

While the illustrated embodiment depicts the use of a corona discharge probe to load the cooking surface, it is also contemplated that the cooking surface can be charged in many other ways, such as by moving a brush or pad that is connected to the power source over the surface. Also, the particular material chosen for the cooking surface may be one that more readily retains hydrogen.

Figure 3A:
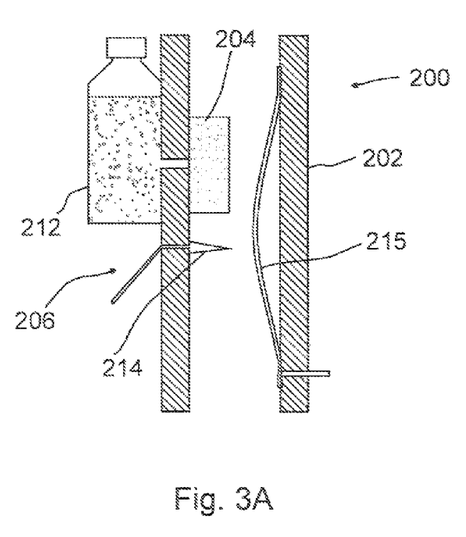
FIGS. 3A and 3B are cross-sectional views of a charging station for use in loading a cooking surface with a treatment material.
Figure 3B:
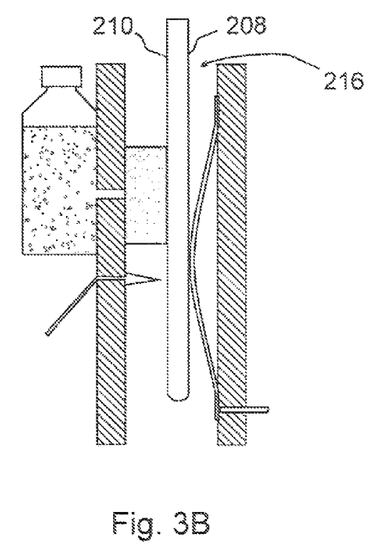

FIGS. 3A and 3B illustrate an embodiment of the present invention for automatically loading a flat cooking pan, such as a griddle of baking sheet. This embodiment includes a charging station 200 which includes a housing 202 that has at least one treatment applicator 204 and at least one charging applicator 206. The treatment applicator 204 preferably is arranged so as to apply the treatment material along a linear path on one side of the pan 208. The treatment applicator 204 may me an absorbent sponge or foam that is designed to contact the face 210 of the pan 208. A refillable treatment material storage reservoir 212 is connected to the treatment applicator 204 for supplying the treatment material.

The charge applicator 206 preferably has one of more charging probes 214 that are arranged to be in contact with or close proximity to the face 210 of the pan 208 when it is inserted into the charging station. The charging probe 214 is adapted to be connect to a power source, such as a conventional outlet. The pan 208 is preferably in contact with a grounded support 215

The charging station housing 202 includes a slotted opening 216 for receiving the pan. In use, the pan is slid into the opening 216 such that the cooking surface 210 comes into contact with the treatment applicator or dispenser 204. As the pan is slid past the treatment applicator 204, the treatment material is automatically applied to the cooking surface. The surface continues past the charge applicator 206 which applies a charge to the cooking surface either continuously while the pan is being slid in or is configured to only apply the charge once the pan has been completed inserted into the housing and treated with the treatment material. It is also contemplated that the arrangement can be reversed and the charge is applied upon the cooking surface being removed from the charging station. In this embodiment, the treatment applicator would be positioned on the opposite side of the charge applicator in FIGS. 3A-3B.

Figure 4:
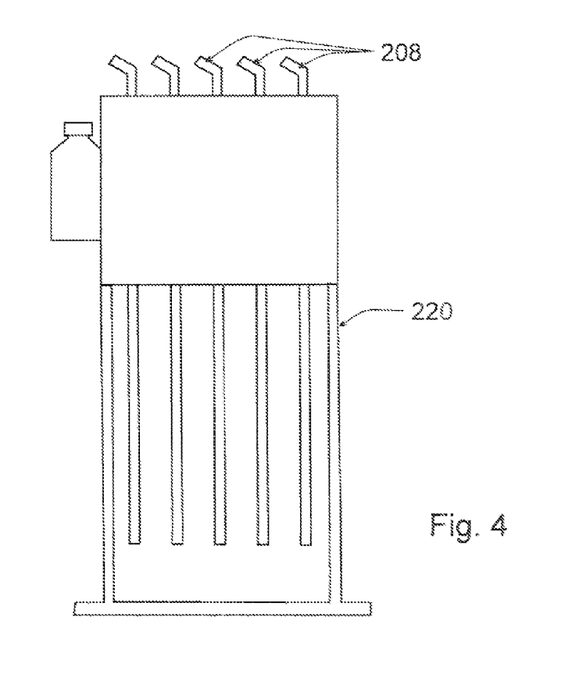
FIG. 4 illustrates one embodiment of the charging station for storing multiple cooking pans.

It is contemplated that the charging station may include a stand 220 as shown in FIG. 4 and be configured to accept multiple baking pans 208, each passing through a separate treatment applicators and charge applicators. The stand permits the multiple pans to be charged and stored on the stand for convenience.

Referring to FIGS. 5A, 5B, 6A, 6B, 7A and 7B, another embodiment of an applicator 300 is shown. In this embodiment, the applicator is a handheld device configured to apply both the treatment material, such as hydrogenated oil, and the high voltage electrical charge. The applicator 300 includes a housing 302 that includes a voltage generator 304, preferably capable of producing voltage in excess of 1000 volts and more preferably greater than 5000 volts and most preferably above 10000 volts. One such generator is a Marx generator, such as a high voltage power supply YD-010S sold by Yui DA Electronics, which is capable of generating between 3000 and 18000 volts at a frequency of 18K to 35K Hz. The current produced is less than 150 µA. A power source 306 provides the necessary input voltage to the generator 304. In the depicted embodiment, the power source is a DC power source, such as a battery. However, it is also contemplated that the power could be a residential or commercial AC power source with appropriate circuitry (e.g., an AC-DC converter) to provide the necessary voltage to the generator 304. The power source could be a rechargeable battery.

An output wire or conductor (preferably the cathode) 308 from the generator is preferably positioned within the housing so as to be in close proximity to the cooking surface when the housing is placed on top of the surface. The position of the conductor is such that an arc of electricity is created between the terminal end of the conductor and the surface. This arc has the effect of boiling off the hydrogenated oil causing the charged hydrogen ions to bind to the cooking surface. Applicant notes that many metals have an inherent anodic potential or galvanic charge that has the innate ability to accept an ionic charge. The electrical arc from the output conductor sends a charge to the treatment material, charging the hydrogen molecules. The charged ions electrically bond to the cooking surface.

While is it contemplated that the terminal end of the output conductor could be positioned so as to directly contact the surface, doing so could cause any hydrogenated oil located between the end of the conductor and the surface from minimizing the generation of an arc. Thus, it is more preferable that there be a spacing between the output conductor end and the surface that is sufficient to create an electrical arc. Those skilled in the art would be readily able to suitably position the terminal end of the output conductor given the applied voltage. In the illustrated embodiment, a plurality of output conductors are positioned in the middle of the housing. However, it is also contemplated that a single conductor could be located in the housing so as to cause a single arc to be generated.

The oppositely charged wire from the generator (the ground or anode wire) need not be grounded since applicant has determined that the atmosphere in most cases provides a sufficient grounding effect. Alternatively, the grounding wire could be connected to contact surfaces 310 formed on the housing that are designed to come into contact with the cooking surface. For example, in the illustrated embodiment, there are two semi-circular contacts 310 which provide a conductive path between the second output wire and the cooking surface. The contacts make be made of any suitable material, such as aluminum bristles or rubber with a conductive carrier.

To minimize the transmission of RF energy from the applicator, a RF shield (not shown) could be installed between the cathode and anode wires.

The applicator 300 may also include a treatment dispenser 312 for applying the treatment material. (For simplicity, the dispenser is only shown in FIGS. 6A, 6B, 7A and 7B which in this embodiment is located on the located on the inside surface of doors 316.) One preferred dispenser 312 is a sponge or similar dispenser that stores a supply of treatment material, such as hydrogenated oil. Since only a small amount of oil is needed to treat a cooking surface, the sponge could be loaded to contain a supply of oil sufficient for the life of the applicator. Alternately, the applicator can be designed to reload the dispenser with additional oil. The dispenser 312 is positioned so as to contact the cooking surface during use or is actuated during use to dispense the necessary amount of treatment material. It is also contemplated that the applicator may not include a specific device that stores treatment material for applying but, instead, requires the user to manually apply the fluid. The applicator may still include the dispenser 312 which operates to spread the treatment materials across the cooking surface.

The applicator preferably includes a switch 314 that may be connected to the power supply or the generator to control supply of power to the generator.

Figure 5A:
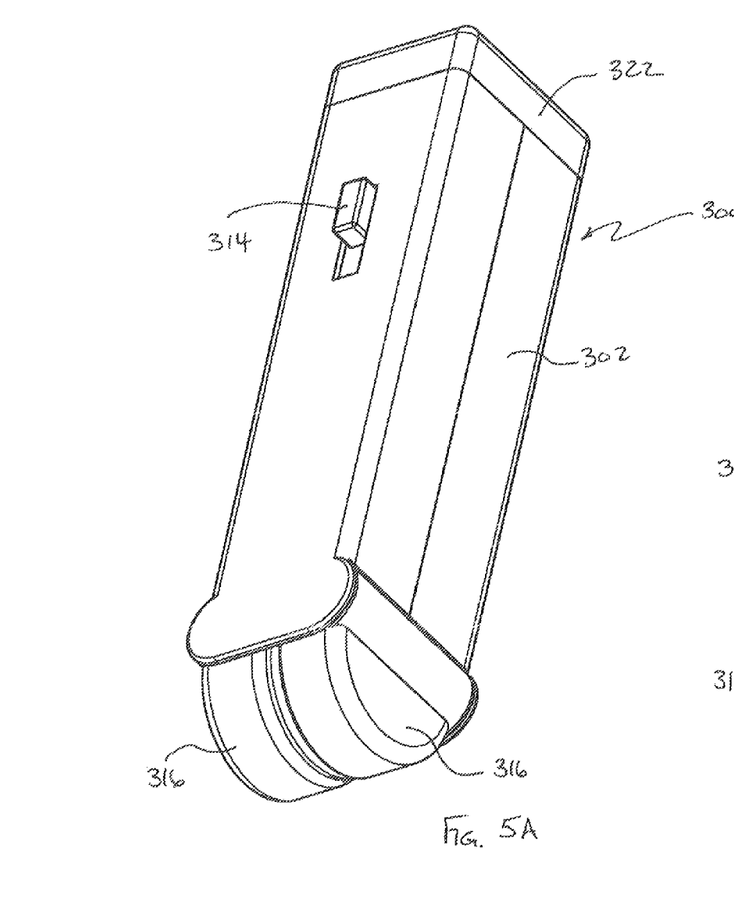
FIG. 5A illustrates a perspective view of a device for creating the low adhesion surface according to one embodiment of the invention.
Figure 5B:
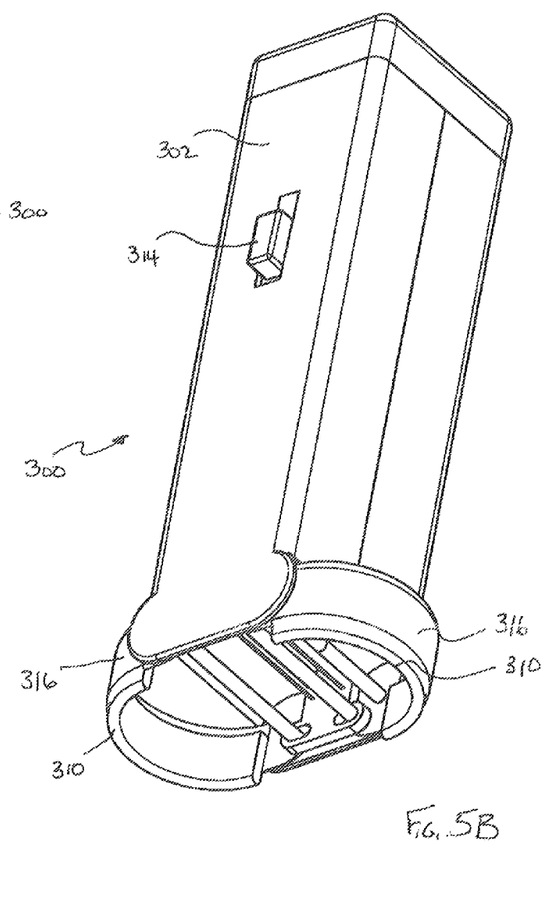
FIG. 5B illustrates the device of FIG. 5A in an open position.
Figure 6A:
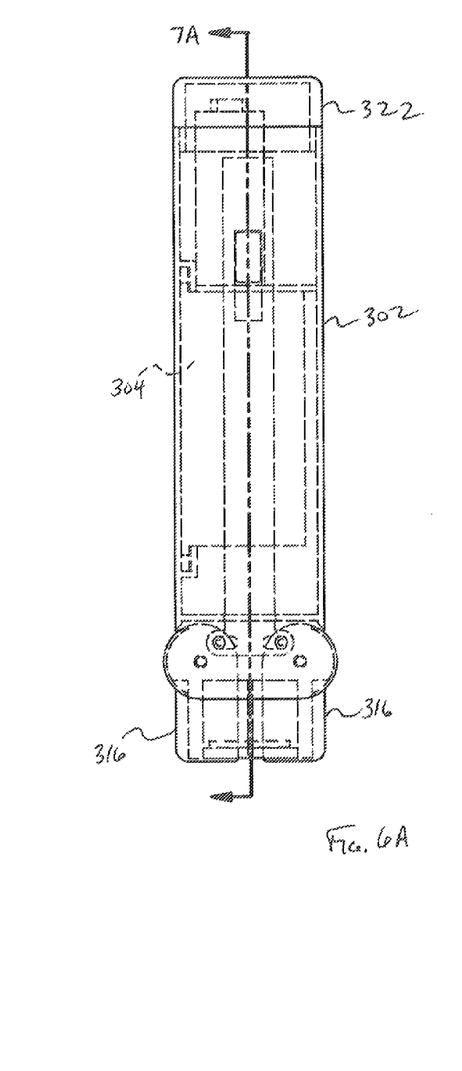
FIG. 6A is the side view of the device of FIG. 5A
Figure 6B:
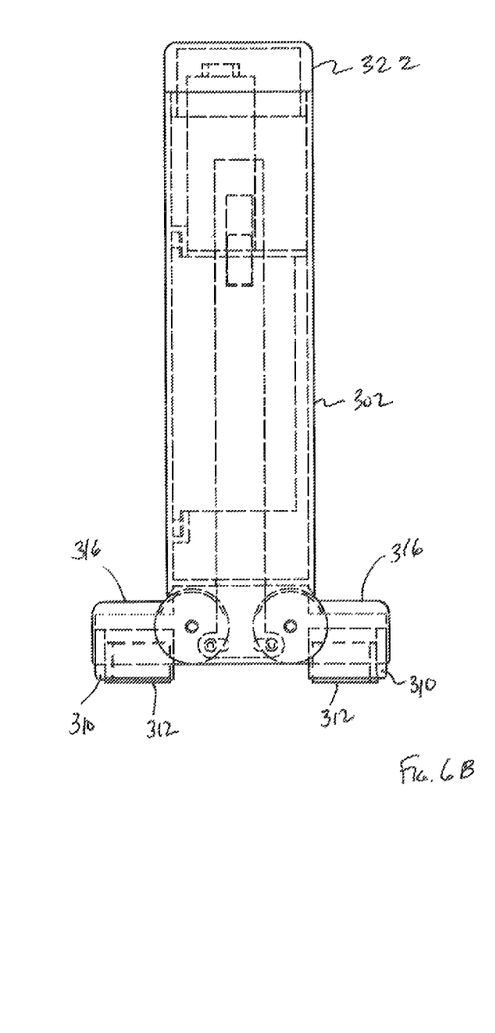
FIG. 6B is a side view of the device as depicted in FIG. 5B.
Figure 7A:
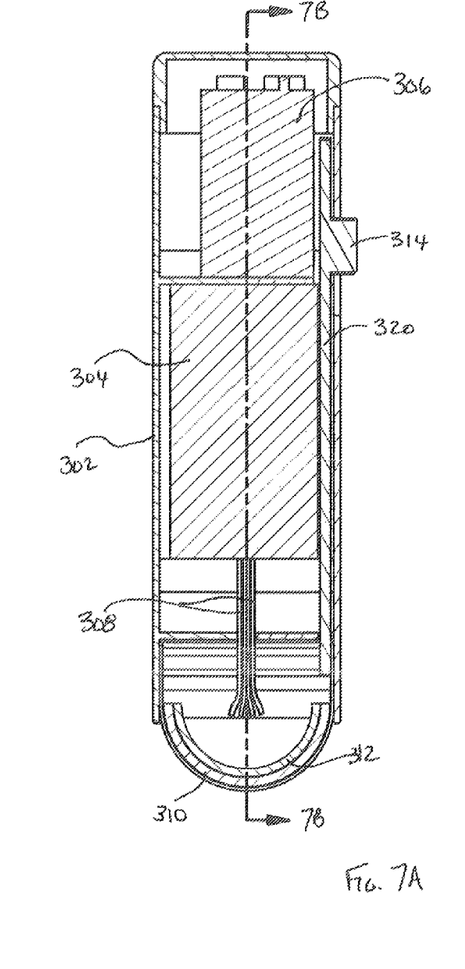
FIG. 7A is a cross-sectional view of the device in FIG. 6A taken along lines 7A-7A.
Figure 7B:
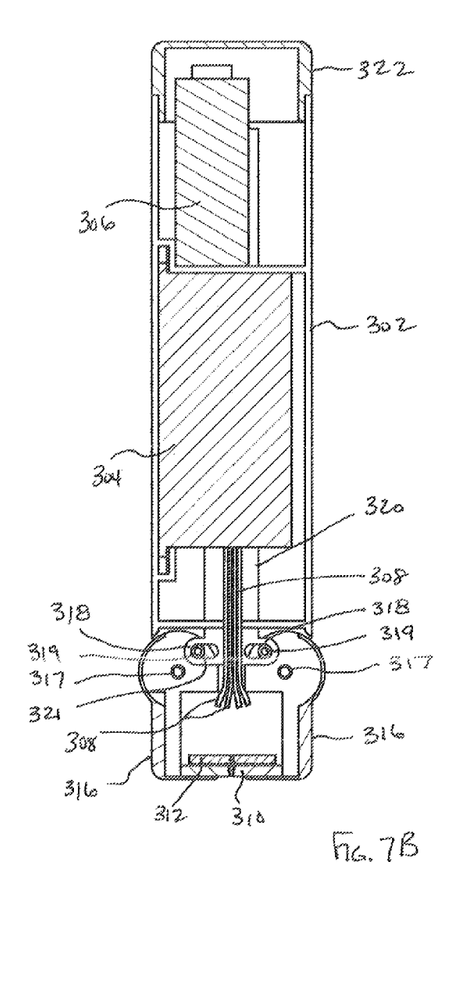
FIG. 7B is a cross-sectional view of the device in FIG. 7A taken along lines 7B-7B.

In the illustrated embodiment, the contacts 310 are mounted to the housing 302 on rotatable doors 316. As shown, the doors 316 are attached to ears 318 on a slide arm 320 that is attached to the switch 314. When the switch is slid to the downward position (corresponding to the "on" position), it causes the slide arm 320 to translate downward. The doors 316 are rotatably mounted to the housing 302 at 317 and include offset pins 319 that are slidably disposed within slots 321 formed in the ears 318. In this embodiment, downward translation of the slide arm 320 causes the ears 318 to rotate the pins 319 about pivot point 317. This causes the doors 316 to rotate from their closed position (shown in FIG. 13 A) to their open position (shown in FIG. 13B) thereby positioning the contacts to touch the cooking surface. A spring (not shown) could be incorporated into the housing and connected to the doors 316 or the slide arm 320 to urge the slide arm upward and the doors 316 into their closed position. In its closed position, the doors 316 function to prevent access to the end of the first output wire 308, thus minimizing the chance of inadvertent shock.

It is also contemplated that the applicator 300 can be designed with the doors 316 shaped such that when the applicator 300 is touching the cooking surface, further downward motion will cause the doors to rotate open, thus causing the output end 308 of the first wire to be brought into close proximity to the cooking surface and the contacts 310 (to the extent they are included) to rest on the cooking surface. Other mechanisms could, of course, be used to cause the contacts 310 to contact the surface. Also, it is contemplated that the contacts 310 may be fixedly mounted to the applicator housing 302.

The applicator 300 preferably includes a cover 322 which is removably attached to the housing 302 so as to permit access to the power source 306 in the embodiments that include a replaceable DC power source.

Figure 8:
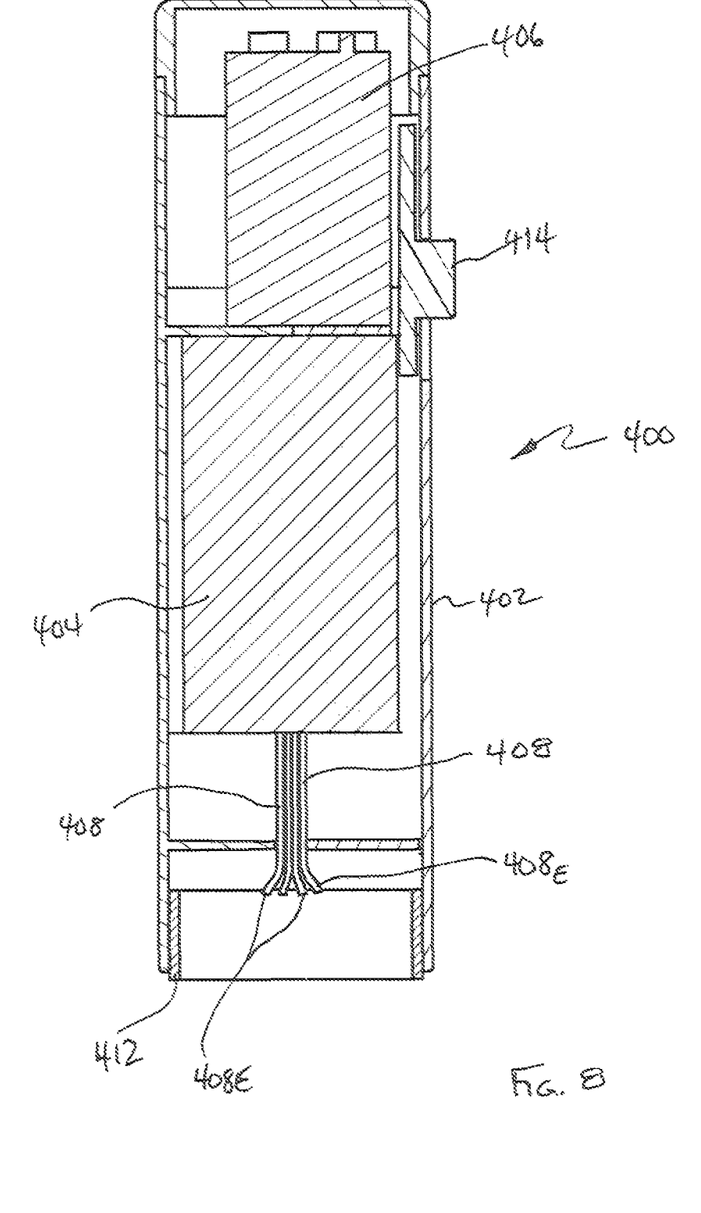
FIG. 8 is a cross-sectional view of an alternate embodiment of a device for creating the low adhesion surface.

FIG. 8 illustrates another embodiment of the applicator 400. In this embodiment, there are no doors on the housing 400. Instead, the housing 402 is cylindrical in shape and terminates in an open bottom. As in the prior embodiment, the housing 402 includes a generator 404 that is connected to a power source 406. The output wires, such as the multiple cathodes 408 shown in the figure, lead from the generator and terminate with their ends $408_E$ located inside the housing 402, preferably recessed from the opening so as to prevent inadvertent contact by a user. A protective cover (not shown) that permits the passage of an electrical charge, may be positioned between the terminate ends $408_E$ and the opening so as to further inhibit a user from touching the exposed ends of the wires. A switch 414 may be included to control operation of the generator 404. The switch can be any conventional switch, including a slide switch as illustrated or a depression switch.

As shown, in order to help apply the treatment material, the applicator may include a dispenser 412, which in the illustrated embodiment is depicted as an annual sponge that functions to store the treatment material for applying to the cooking surface and also assisting is dispensing (or spreading) the treatment material prior to or during application.

Figure 9:
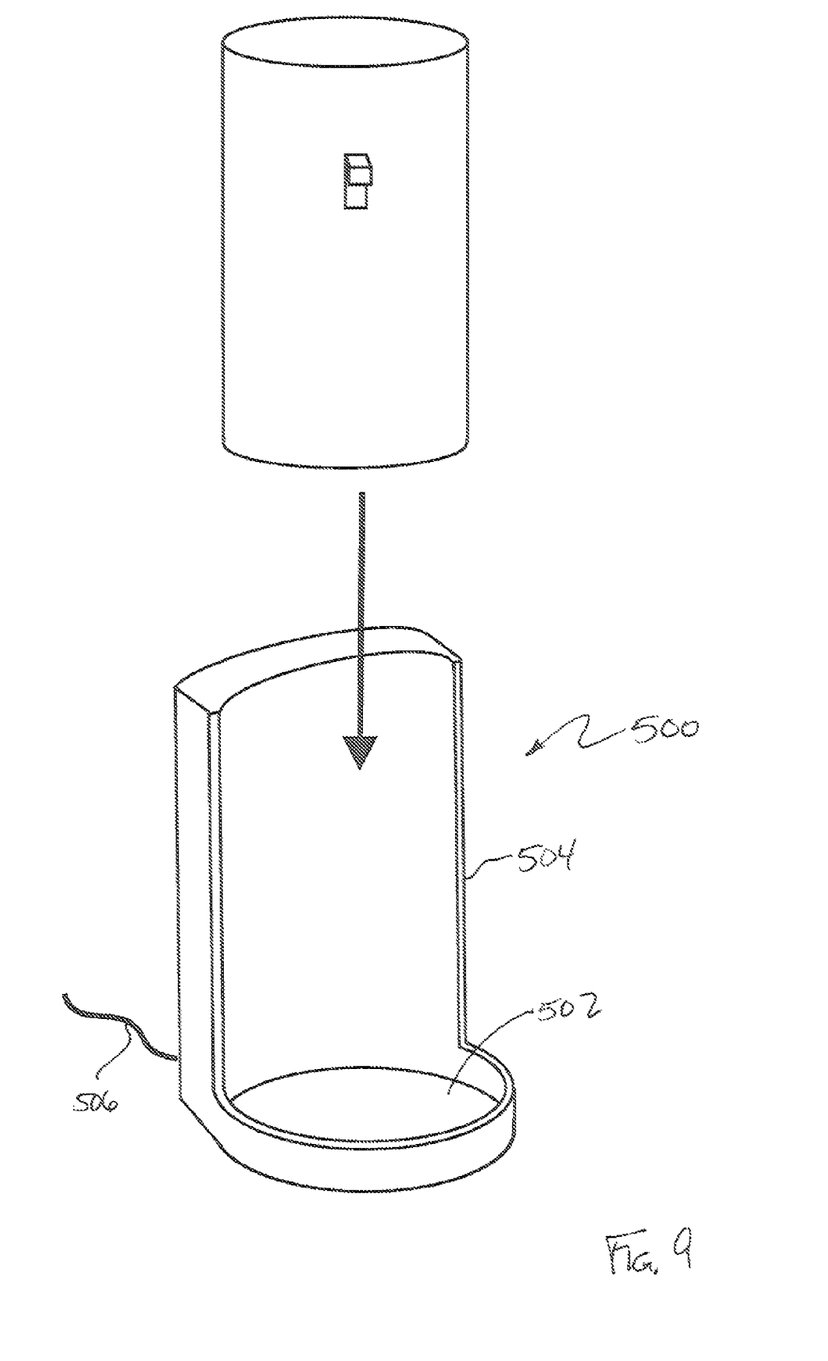
FIG. 9 illustrates an embodiment of the invention that includes a charging base.

If the applicator includes a rechargeable battery, it is contemplated that the applicator may include a recharging base 500 as shown in FIG. 9 for recharging the battery. The base may include a seat 502 into which the housing bottom is placed. The seat 502 can have a reservoir connected to it for channeling a supply of treatment material to refill or recoat the dispenser. The base includes conventional recharging circuitry inside the housing 504 and an external cord 506 for connecting to an AC power source.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

The invention claimed is:

1. A handheld kitchen device for creating a low adhesion cooking surface on a cooking surface, the device comprising:
    a housing having an interior and an open end providing an opening into the housing;
    a voltage generator mounted within the housing, the voltage generator configured to receive a supply of power from a power source, the voltage generator configured to producing a negative voltage sufficient to create an arc for releasing hydrogen ions from a hydrogen containing substance;
    a switch for controlling activation of the voltage generator; and
    at least one output cathode conductor connected to the voltage generator for transmitting the negative voltage and located entirely within the housing, the at least one output cathode conductor having an exposed terminal end located within the housing at a position between the voltage generator and the open end of the housing at a location spaced inward from the open end that is a sufficient distance such that it is configured to cause a negatively charged arc to pass from the terminal end of the at least one output cathode conductor located inside the housing through the open end to the cooking surface when the terminal end is located in close proximity to the cooking surface, the arc causing hydrogen from the hydrogen containing substance to form or remain on the cooking surface.

2. The handheld kitchen device of claim 1 wherein the housing is shaped to be held by a user's hand, wherein there at least one output cathode conductor is multiple cathode conductors, each cathode conductor having a terminal end positioned within the housing, and wherein the power source is a removable or rechargeable battery located within the housing.

3. The handheld kitchen device of claim 1 wherein the housing includes at least one door for closing off the opening in the housing when the device is not operating and preventing access to the terminal end of the at least one output cathode conductor, the at least one door being pivotally or hingedly mounted to the housing.

4. The handheld kitchen device of claim 3 wherein there are two doors mounted to the housing, each door closing a portion of the opening in the housing.

5. The handheld kitchen device of claim 1 further comprising a dispenser for dispensing a treatment material to the cooking surface, the treatment material containing the hydrogen containing substance.

6. The handheld kitchen device of claim 5 wherein the dispenser is mounted to the housing and positioned so as to dispense the treatment material on the cooking surface.

7. The handheld kitchen device of claim 6 wherein the housing includes at least one door for closing off the opening in the housing when the device is not operating, the at least one door being pivotally or hingedly mounted to the housing, wherein the dispenser is mounted to the housing and accessible when the at least one door is in its open position, the dispenser being configured to retain the treatment material and apply the retained treatment material during use.

8. A kitchen device for creating a low adhesion cooking surface comprising:
    a housing having an interior and an open end providing an opening into the housing;
    a voltage generator mounted within the housing, the voltage generator configured to receive a supply of power from a power source, the voltage generator configured to producing a negative voltage sufficient to create an arc for releasing hydrogen ions from a hydrogen containing substance;
    a switch for controlling activation of the voltage generator;

output cathode conductors connected to the voltage generator and located entirely within the housing, the output cathode conductors configured to transmit negative voltage from the voltage regulator, the output cathodes each having an exposed terminal end that is located within the housing at a position between the voltage generator and the open end of the housing at a location spaced inward from the open end that is a sufficient distance such that it is configured to cause a negatively charged arc to pass from the terminal end of the output cathode conductor located inside the housing through the open end to the cooking surface when the terminal end is located in close proximity to the cooking surface; and a dispenser for containing a treatment material, the treatment material containing the hydrogen containing substance, the dispenser mounted to the housing adjacent to the open end, the dispenser configured to spread the treatment material as the kitchen device or cooking surface is moved relative to one another.

9. The kitchen device of claim 8 wherein the power source is a removable or rechargeable battery located within the housing, and wherein the output cathode conductors are recessed within the housing spaced apart from the open end.

10. The kitchen device of claim 8 wherein the housing includes at least one door for closing off the open end of the housing when the device is not operating and preventing access to the terminal end of the output cathode conductors, the at least one door being pivotally or hingedly mounted to the housing.

11. The kitchen device of claim 10 wherein the at least one door is connected to the switch such that activation of the switch causes the at least one door to open.

12. The handheld kitchen device of claim 1 wherein the handheld device is configured upon activation to create the low adhesion cooking surface by supplying power from the power source to the voltage generator, the voltage generator causing negative voltage to transmit into the at least one output cathode conductor, wherein the spacing of the terminal end of the at least one output cathode conductor from the open end is sufficient to generate a negatively charged arc from the terminal end of the output cathode conductor located inside the housing to the cooking surface adjacent to and outside of the open end;

the arc creating an electric charge on or near the cooking surface which is sufficient to extract hydrogen from the substance on the cooking surface;

wherein the housing has an outer surface that is substantially cylindrical in shape with a diameter sized and configured to be grasped by a user's hand, wherein the voltage generator is mounted within the interior of the housing at a location spaced apart from the open end;

wherein the switch is mounted to the housing and accessible outside the housing by a user, the switch being electrically connected to the voltage generator, and wherein the at least one output cathode conductor extends from a side of the voltage generator that is different from the side where the switch is located.

13. A process for creating a low adhesion cooking surface comprising the steps of:

providing a cooking surface;

placing a hydrogen containing substance on the cooking surface;

providing a handheld kitchen device for generating a voltage, the device being separate from the cooking surface and comprising:

a housing having an interior and an open end providing an opening into the housing;

a voltage generator mounted within the housing, the voltage generator configured to receive a supply of power from a power source, the voltage generator configured to producing a negative voltage sufficient to create an arc for releasing hydrogen ions from the hydrogen containing substance;

a switch for controlling activation of the voltage generator; and at least one output cathode conductor connected to the voltage generator for transmitting the negative voltage and located entirely within the housing, the at least one output cathode conductor having an exposed terminal end located within the housing at a position between the voltage generator and the open end of the housing at a location spaced inward from the open end that is a sufficient distance such that it is configured to cause a negatively charged arc to pass from the terminal end of the at least one output cathode conductor located inside the housing through the open end to the cooking surface when the terminal end is located in close proximity to the cooking surface, the arc causing hydrogen from the hydrogen containing substance to form or remain on the cooking surface;

placing one of either the cooking surface or the handheld kitchen device in close proximity to the other;

activating the handheld kitchen device to cause a negatively charged arc to pass from within the housing of the handheld kitchen device to the cooking surface to generate an electric charge on or near the cooking;

extracting the hydrogen from the substance with the electric charge prior to cooking so that the hydrogen remains on the cooking surface.

14. The process of claim 13, wherein the step of placing a hydrogen containing substance on the cooking surface involves applying a hydrogenated oil to the cooking surface.

15. The process of claim 13, wherein the step of extracting hydrogen involves drawing hydrogen into pores or recesses in the cooking surface.

16. The process of claim 15, wherein the step of extracting hydrogen involves grounding a portion of the surface prior to creating the electric charge.

17. The process of claim 13, wherein the step of extracting hydrogen involves applying an electric charge to the cooking surface or the hydrogen containing substance, the electric charge causing hydrogen ions in the hydrogen containing substance to electrically bond to the cooking surface.

* * * * *